C. F. DUNDERDALE.
Manufacture of Illuminating Gas.
No. 94,297. Patented Aug. 31, 1869.
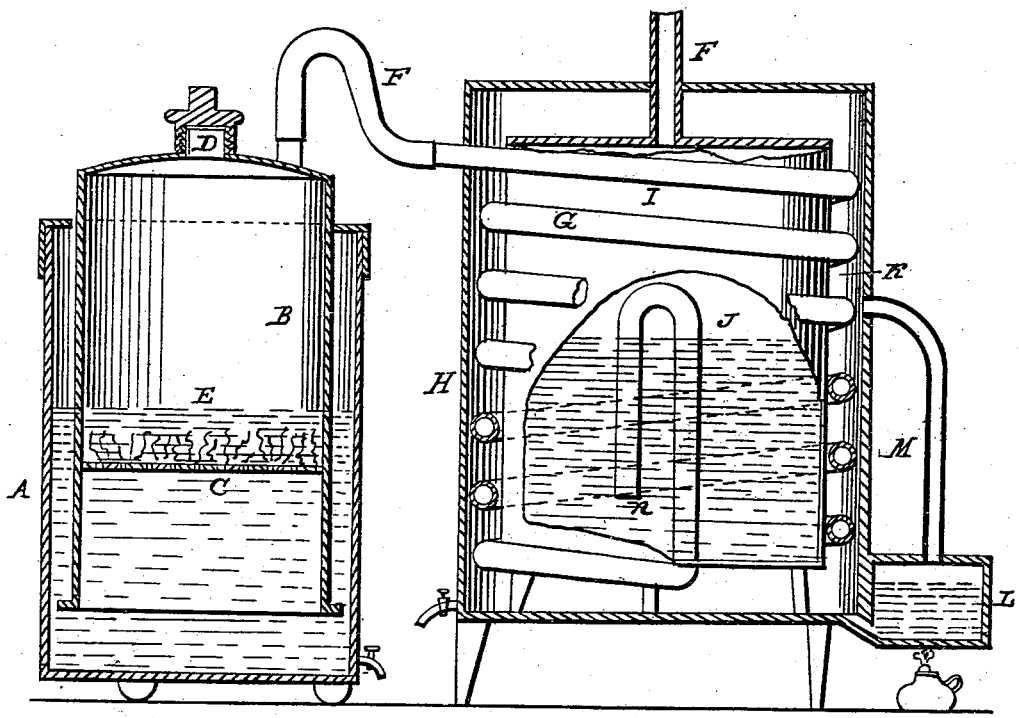

United States Patent Office.

CLEAVELAND F. DUNDERDALE, OF NEW YORK, N. Y.

Letters Patent No. 94,297, dated August 31, 1869.

IMPROVEMENT IN THE MANUFACTURE OF ILLUMINATING-GAS.

The Schedule referred to in these Letters Patent and making part of the same.

*To all whom it may concern:*

Be it known that I, CLEAVELAND F. DUNDERDALE, of New York, in the county of New York, and State of New York, have invented a new and useful Improvement in the Manufacture of Illuminating-Gas; and I do hereby declare that the following is a full, clear, and exact description thereof, which will enable others skilled in the art to make and use the same, reference being had to the accompanying drawings, forming part of this specification.

This invention relates to an improved machine for manufacturing illuminating-gas; and It consists in the combination and arrangement of the parts of the same, as will be hereinafter more fully described.

The accompanying sheet of drawing represents a sectional elevation of the apparatus, showing the parts of which it is composed, and the arrangement thereof.

Similar letters of reference indicate corresponding parts.

A represents a vessel or tank, open at the top, of cylindrical or other form, made water-tight, of any material that will resist the action of acids.

B is another tank or vessel in a reversed position, inside of A, as seen in the drawing.

C is a perforated partition in the vessel B,

D represents an opening in the top of B, covered by a screw-cap.

E represents the surface of a body of diluted sulphuric acid contained in the vessel A.

On the perforated partition C, zinc, or scraps or borings of iron are placed, from which hydrogen-gas is generated from the action of the acid. The pressure of this gas in the upper portion of the vessel B will cause that vessel to rise, and when it rises sufficiently to withdraw the partition C, and the metal or material thereon from the acid, the generation of gas will cease. When the pressure diminishes in consequence of the discharge or consumption of gas, the vessel will fall, and the metals will be again immersed, and the action will be renewed, thus forming, by this arrangement, a perfect automatic regulator for the generation of the hydrogen.

F is a flexible tube, which connects the vessel B with the coil or worm G.

H is a tight vessel or casing surrounding the interior vessel I, which contains hydrocarbon-liquid, the surface of which liquid is seen at J.

The coil G is contained in the annular space K, between the casing H and vessel I.

This space is filled with steam from the vessel L, under which a fire is placed, as seen in the drawing; or it may be filled with hot water or other heated liquid.

In this example of my invention, steam is conducted into the annular space, and around the coil-tube G, through the pipe *m*.

By the heat thus imparted, the hydrogen-gas becomes greatly expanded and prepared for absorbing and combining permanently with the vapor of the hydrocarbon-liquid, which is raised in temperature or heated by the same process.

As seen in the drawing, the coiled tube G, (containing the hydrogen) passes up from the annular space K, through the bottom of the vessel I, and into and through the hydrocarbon-liquid.

After rising above the surface of the liquid, it curves down and into the liquid, and discharges the hydrogen into the liquid at the point *n*, from whence it ascends, carrying with it more or less of the liquid, and becomes thoroughly saturated therewith as it rises into the reservoir above the liquid.

The hydrogen and the hydrocarbon-liquid being in a heated state, more of the vapor of the hydrocarbon is absorbed, and the combination is more complete and permanent, than it could be were they in a cold state.

Through the agency of the heat employed, the union of the hydrogen with the vapor of the hydrocarbon assumes more the character of a chemical combination, and consequently the product is not so much affected by the reduction of temperature which takes place in passing through the service-pipes of the burners.

P represents the pipe through which the carburetted hydrogen is discharged to the burners. Suitable faucets are attached to the vessels A and H, for drawing off the liquids contained in them as occasion may require.

The zinc, iron scraps, borings, &c., are introduced through the aperture D, and renewed as often as may be required.

Having thus described my invention,

I claim as new, and desire to secure by Letters Patent—

The vessels A B and H I, the flexible pipe F, coiled tube, G pipe *m*, and boiler L, all combined and arranged as herein described, for the purpose specified.

CLEAVELAND F. DUNDERDALE.

Witnesses:
 FRANK BLOCKLEY,
 ALEX. F. ROBERTS.